(12) United States Patent
Siverson et al.

(10) Patent No.: US 8,527,391 B2
(45) Date of Patent: Sep. 3, 2013

(54) QUOTE INACTIVATION SYSTEM AND METHOD FOR AN AUTOMATED EXCHANGE FOR TRADING DERIVATIVE SECURITIES

(75) Inventors: Robert J. Siverson, Fairfield, CT (US); Greg J. Maynard, Port Washington, NY (US)

(73) Assignee: International Securities Exchange, LLC, New York, NY (US)

( * ) Notice: Subject to any disclaimer, the term of this patent is extended or adjusted under 35 U.S.C. 154(b) by 350 days.

(21) Appl. No.: 12/497,095

(22) Filed: Jul. 2, 2009

(65) Prior Publication Data

US 2011/0004540 A1     Jan. 6, 2011

(51) Int. Cl.
*G06Q 40/00*     (2012.01)
(52) U.S. Cl.
USPC ............................................. 705/37
(58) Field of Classification Search
CPC ....................................... G06F 17/60
USPC ............................................. 705/37
See application file for complete search history.

(56) References Cited

U.S. PATENT DOCUMENTS

| 7,321,873 | B2 * | 1/2008 | Reuter et al. ................... 705/37 |
| 2001/0056393 | A1 * | 12/2001 | Tilfors et al. .................. 705/37 |
| 2003/0041006 | A1 * | 2/2003 | Bunda ............................ 705/37 |
| 2004/0024713 | A1 * | 2/2004 | Moore et al. ................... 705/75 |
| 2005/0075963 | A1 * | 4/2005 | Balabon ........................ 705/36 |
| 2005/0228741 | A1 * | 10/2005 | Leibowitz ..................... 705/37 |
| 2006/0149659 | A1 * | 7/2006 | Carone et al. ................. 705/37 |
| 2008/0243673 | A1 * | 10/2008 | Ferguson et al. ............... 705/37 |
| 2008/0294468 | A1 * | 11/2008 | Toland, Jr. ..................... 705/4 |

FOREIGN PATENT DOCUMENTS

EP     1 265 178     * 12/2002

OTHER PUBLICATIONS

Nord Pool: ELBAS Intradaty Trading System User Manual. Mar. 2008, pp. 1-25.*
Eurex: Eurex Realeae 8.0, Values API Modification Notes, Feb. 16, 2006, Final Version—Updates 1, pp. 1-22.*
Prix et al.: Algorithmic Trading Patterns in Xetra Orders, Dec. 2007, The European Journal of Finance, vol. 13, No. 8, pp. 717-739.*
Nordpool: ELBAS Intraday Trading System User Manual, Mar. 2008, pp. 1-25.*

* cited by examiner

*Primary Examiner* — Bijendra K Shrestha
(74) *Attorney, Agent, or Firm* — Frommer Lawrence & Haug, LLP

(57) ABSTRACT

An automated system and method for trading option instruments on an automated exchange comprising a participant system for communicating with an automated exchange system. The disclosed system and method allows a market professional such as a market maker to inactivate the quotes in instruments for a related product while the market maker's quoting engine continues to update the quotes. Also disclosed is a system and method for reducing load on a exchange network in recalculating a best bid and offer price. Disclosed herein is a system and method for maintaining control over professional quotes for the purchase and sale of option instruments for a product in an exchange system.

10 Claims, 5 Drawing Sheets

QUOTE INACTIVATION SYSTEM AND METHOD FOR AN AUTOMATED EXCHANGE FOR TRADING DERIVATIVE SECURITIES

BACKGROUND

1. Field of the Invention

This invention relates generally to markets for the exchange of derivative securities, such as option contracts.

2. Background Discussion

Conventional trading of securities, such as, for example, stocks, exchange traded funds ("ETFs"), and listed equity options, takes place on a national securities exchange that is registered as such with the United States Securities and Exchange Commission. The options market first developed in the 1970s. Options for the purchase and sale of listed stocks once were traded domestically only on floor-based exchanges, for example, the American Stock Exchange (AMEX). The method of trading options contracts in these floor-based environments is known as an "open outcry" system because trading takes place through oral communications between market professionals at a central location in open view of other market professionals. In this system, an order is typically relayed out to a trader standing in a "pit." The trader shouts out that he has received an order and waits until another trader or traders shouts back a two-sided market (the prices at which they are willing to buy and sell a particular option contract), then a trade results. In an effort to preserve this antiquated system of floor-based trading, the transition to and use of computer-based technology on these exchanges has been slow. Some of the processes that take place on these floor-based exchanges have been automated or partially automated.

Exchanges now may be floor-based, fully-electronic, or utilize a hybrid model that incorporates some floor-based features and some electronic features. An example of a floor-based exchange is the New York Stock Exchange ("NYSE"). An example of a fully-electronic exchange is the International Securities Exchange ("ISE"). An example of a hybrid exchange is the Chicago Board Options Exchange ("CBOE").

By way of background, markets rely on the skills of market professionals known as market makers, who are responsible for maintaining liquidity in the market. Market makers fulfill this responsibility by ensuring that there is always a two-sided market through providing prices (quotations) at which they are both willing to buy (bid) and sell (offer) a particular option contract and honoring those quotations when trading with incoming orders.

In an electronic market, market makers provide constant quotes—a price to buy and a price to sell a particular financial instrument. As used herein, financial instrument includes a derivative instrument, such as an options contract to purchase or sell a quantity of an underlying instrument, for example, shares of stock. As used herein, a product refers to a range of derivative instruments (e.g., option contracts) that relate to the same underlying instrument, for example, all options on an IBM stock. Some market makers for an options market provide quotes in all instruments (i.e., all options traded on the market). As the market moves, the market makers update their quotes accordingly. The quotes are live and can be traded against by any other party. Options are particularly challenging for market makers because a very large number of instruments may be traded on a single exchange. For instance, the International Stock Exchange (ISE) trades 250,000 different instruments. Many market makers submit firm quotes for all 250,000 instruments. To maintain accurate prices for all their quotes, market makers submit about 20,000 new prices to the market each second. As a result, market makers are an example of a high frequency traders. High frequency traders submit quotes on large numbers of instruments, typically on the order of hundreds of thousands and do so in a relatively short period of time. The rate at which high frequency traders submit quotes to a market is typically limited only by the speed that computers and communications systems can handle such quotes. This rate may be in the tens of thousands per second.

Occasionally there are technology issues that prevent a market maker from updating quotes, causing prices to be stale or incorrect. When this happens, the market price may move so that the market maker's quotes are disadvantageous. To limit their exposure, market makers react by deleting all of their quotes until the technical difficulty is resolved. Once the problem is corrected, they reload the quotes. Deleting quotes takes time and often the market makers experience losses because trades are executed against mis-priced quotes before the market maker can delete them. This in turn makes the market makers less willing to provide their best quotes.

Another problem arises when market makers resubmit a large number of their quotes after deleting them. If the market maker's computer system can send 20,000 quotes per second, and there are 250,000 quotes in the market, it takes over ten seconds to reload all the quotes. Moreover, reloading so many quotes at the same time causes all network systems to give poor response times. This additional load may lead to the same kinds of technical problems that caused the market maker to delete its quotes in the first place. The market maker removed its quotes because it thought there was a problem, and now it is putting new quotes back into the market and they are being reloaded in a sluggish manner. The market maker may not be able to tell if the initial problem is resolved.

The tools that the market maker has to address these issues are a) a "mass delete" function, which lets the market maker remove all its quotes, and b) a "selective delete," such as the "Speedbump" function provided by the ISE, which removes the market maker's quotes for all instruments in one product if the number of contracts traded in a set period of time exceeds a pre-determined threshold. In either case, until the problem is resolved the market marker ceases to send new quotes to the market, at least for product that caused the mass delete or triggered the speed bump. Because quotes are not flowing to the market, it is difficult for the market maker to determine what went wrong. Another problem resulting from market markers deleting and reloading quotes is a disruption in the price discovery function that sets the Best Bid and Offer (the "BBO") for the exchange. The BBO is calculated as the total size available on exchange at the best bid price and best offer price. The BBO is updated with each order and quote entered onto the market. When a market maker deletes all of their quotes it creates a massive spike in the market data volumes. This spike interrupts the market data stream reporting the BBO.

BRIEF SUMMARY OF THE INVENTION

The present invention is directed toward systems and methods for trading financial instruments. In one embodiment, disclosed is a system for trading financial instruments on an automated exchange. The system includes a participant computer system for communicating with an automated exchange system including a processor and a memory. The memory includes program memory for a quote engine that electronically generates a plurality of quotes for the purchase and sale of an instrument and program memory for a program, that, when the processor executes program instructions, generates a quote handling instruction for the plurality of quotes for the instrument. The quote handling instruction includes instructing the exchange system to make the quotes inactive for a transaction thereon and instructing the exchange system to reactivate the quotes for a transaction thereon. The system also comprises an interface operatively connected to a network and adapted to transmit the quotes to the exchange system, and transmit the quote handling instruction to the exchange system.

The system also comprises an automated exchange for trading a financial instrument, including a server having a processor and an interface operatively connected to the network that is adapted to receive the plurality of quotes for the purchase or sale of the instrument, and the quote handling instruction. The automated exchange also comprises a memory, the memory including program memory for a program that, when the processor executes program instructions, makes the received quotes unavailable for a transaction thereon if the received quote handling instruction instructs the exchange system to make the quotes inactive, wherein the quotes remain on the exchange system while inactive, and makes the received quote available for a transaction thereon if the received quote handling instruction instructs the exchange system to reactivate the quotes. The quote handling instruction can comprise a flag.

The network that the participant's network interface is operatively connected to can include a plurality of networks where the network by which the quote handling instruction is transmitted to the exchange system is independent of the network by which the plurality of quotes is transmitted to the exchange system.

The instrument can includes a plurality of instruments and the quote handling instruction can includes instructions to inactivate and reactivate the quotes for some or all of the instruments. The plurality of quotes can include quotes for the plurality of instruments in a product, and the product can include a plurality of products. The quote instruction can include an instruction selected from the group consisting of: instructing the exchange system to make the quotes inactive for a transaction in all products; instructing the exchange system to reactivate the quotes for a transaction in all products; instructing the exchange system to make the quotes inactive for in a select product; and instructing the exchange system to reactivate the quotes for a transaction in the select product.

The exchange server can include program memory for a matching engine that, when the processor executes program instructions, executes an update of quotes on the exchange for a best bid and offer calculation. The program memory can include a program that, when the processor executes program instructions, calculates the best bid and offer as a function of the update. The sever can include a timer configured to interpose a delay for a predetermined time period upon the execution of a quote handling instruction, wherein the quotes subject to the quote handling instruction do not trigger the update of the best bid and offer during the delay, and wherein the matching engine updates the best bid and offer triggered by quotes other than the quotes subject to the quote handling instruction during the delay. The system can also includes program memory for a program that, when the processor executes program instructions, triggers the best bid and offer update as a function of quotes subject to the quote handling instruction after the delay. Timer can further be configured to interpose a plurality of delays over a plurality of successive predetermined time periods where a predetermined portion of the quotes subject to the quote handling instruction can trigger the best bid and offer update after each time period expires.

In another embodiment of the invention, also disclosed is a device for exchanging data with an automated exchange system including: a computer device having a processor and a memory, the memory including program memory for an application that, when the processor executes program instructions, generates a quote handling instruction for a plurality of electronically generated quotes for a financial instrument. The quote handling instruction includes: instructing the exchange system to make the quotes inactive for a transaction thereon, wherein the quotes remain on the system, and instructing the exchange system to reactivate the quotes for a transaction thereon. The device also includes a network interface adapted to transmit the quote handling instruction to the exchange system over a network. The network that the devices's network interface is operatively connected can includes a plurality of networks and the network that the quote handling instruction is transmitted to the exchange system can be independent of the network that the plurality of quotes is transmitted to the exchange system on.

In another embodiment, disclosed is an automated exchange for trading a financial instrument, including: a server having a processor, an interface operatively connected to a network and adapted to receive a plurality of quotes for the purchase or sale of an instrument and a quote handling instruction, and a memory. The memory includes program memory for a program that, when the processor executes program instructions, makes the received quotes unavailable for a trade thereon if the received quote handling instruction instructs the exchange system to make the quotes inactive for a transaction thereon, wherein the quotes remain on the exchange system while inactive, and makes the received quote available for a trade thereon if the received quote handling instruction instructs the exchange system to reactivate the quotes for a transaction thereon. The network that the exchange's network interface is operatively connected to can include a plurality of networks where the network that the quote handling instruction is received by is independent of the network that the plurality of quotes is received by the exchange system on. The instrument can includes a plurality of instruments and the quote handling instructions can include instructions to inactivate and reactivate the quotes for some or all of the instruments. The quotes can be received for the plurality of instruments in a product, the product can a plurality of products, and the quote instructions can include instructions selected from the group consisting of instructing the exchange system to make the quotes inactive for a transaction on all products; instructing the exchange system to reactivate the quotes for a transaction on all products; instructing the exchange system to make the quotes inactive for a select product; and instructing the exchange system to reactivate the quotes for a transaction on the select product. The quote handling instruction can comprise a flag.

The exchange server can include program memory for a matching engine that, when the processor executes program instructions, executes an update of quotes on the exchange for a best bid and offer calculation; program memory for a program that, when the processor executes program instructions, calculates the best bid and offer as a function of the update; and a timer configured to interpose a delay for a predetermined time period upon the receipt of a quote handling instruction, wherein the quotes subject to the quote handling instruction do not trigger the update of the best bid and offer during the delay and wherein the matching engine updates the best bid and offer triggered by quotes other than the quotes subject to the quote handling instruction during the delay. The exchange can include program memory for a program that, when the processor executes program instructions, triggers the best bid and offer update as a function of quotes subject to the quote handling instruction after the delay. The timer can be further configured to interpose a plurality of delays over a plurality of successive predetermined time periods where a predetermined portion of the quotes subject to the quote handling instruction can be used to trigger the best bid and offer update after each time period expires.

In another embodiment disclosed is a method of reducing load on an exchange system comprising: receiving a plurality of quotes for the purchase and sale of a financial instrument for a product in the exchange system; and subjecting selected quotes to a quote handling instruction. The instruction can be selected from the group of making selected quotes inactive for a transaction thereon, wherein the select quotes remain on the exchange system while inactive, and reactivating the select quotes for a transaction thereon. The method includes delaying for a predetermined period of time an update of a best bid and offer triggered by the quotes subject to the quote handling instruction and updating the best bid and offer triggered by quotes other than the selected quotes. The method can further include triggering an update of the best bid and offer using quotes subject to the quote handling instruction after the predetermined period of time. The method can further comprise delaying the update of the best bid and offer over a plurality of successive predetermined time periods by triggering the best bid and offer update after each time period expires using a predetermined portion of the quotes subject to the quote handling instruction.

In another embodiment of the invention, disclosed is a method for maintaining control over professional quotes for the purchase and sale of financial instruments for a product in an exchange system, comprising: electronically generating a plurality of quotes for the purchase and sale of financial instruments; electronically generating a quote handling instruction for the plurality of quotes, wherein the quote handling instruction includes instructing the exchange system to make the quotes inactive for a transaction thereon and wherein the quotes remain on the exchange system while inactive and instructing the exchange system to reactivate the quotes for a transaction thereon; and transmitting the quotes to the exchange system over a network; and transmitting the quote handling instruction to the exchange system over a network.

The method can further comprise connecting to one of a plurality of networks operatively connecting a participant to an exchange system and transmitting the quote handling instruction over a network that is independent of the network that the plurality of quotes is transmitted over. The instrument can include a plurality of instruments and the quote handling instruction can comprise instructing the exchange system to inactivate and reactivate the quotes for some or all of the instruments. The plurality of quotes can includes quotes for a plurality of instruments in a product, the product can include a plurality of products, and the quote instruction can include instructions selected from the group consisting of: instructing the exchange system to make the quotes inactive for a transaction on all products; instructing the exchange system to reactivate the quotes for a transaction on all products; instructing the exchange system to make the quotes inactive for a select product; and instructing the exchange system to reactivate the quotes for a transaction on the select product.

The quote handling instruction further include instructing the exchange system to flag the product.

BRIEF DESCRIPTION OF THE DRAWINGS

The present invention will be understood more fully with reference to the drawings. The drawings are provided for the purpose of illustration and are not intended to limit the invention.

DETAILED DESCRIPTION OF THE INVENTION

Figure 1:
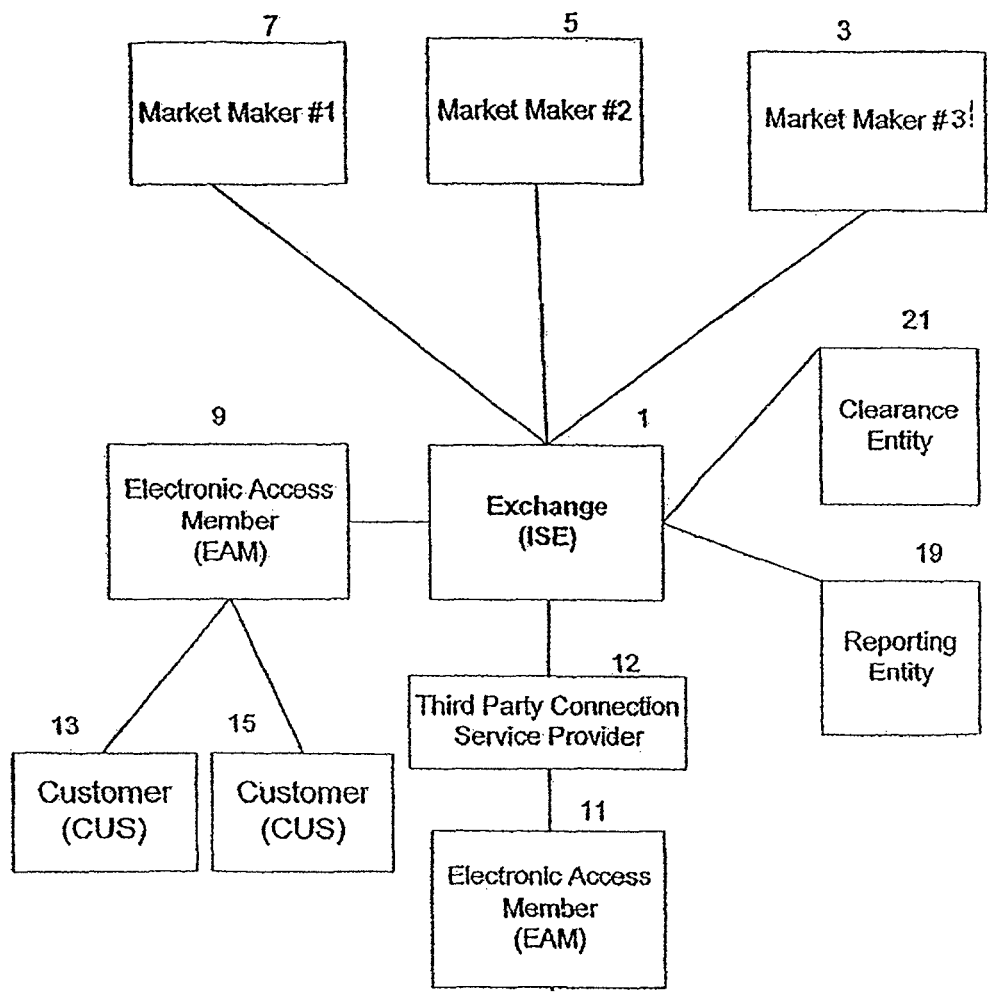
FIG. 1 shows a block diagram of an automated exchange system according to one embodiment of the invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

The detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

The present invention provides an automated system and method for trading financial instruments on an automated exchange comprising a participant system communicating with an automated exchange system. The disclosed system and method allows a market professional such as a market maker to "inactivate" the quotes in instruments for a related product while the market maker's quoting engine continues to update the quotes. Also disclosed is a system and method for reducing load on an exchange network. Disclosed herein is a system and method for maintaining control over professional quotes for the purchase and sale of financial instruments for a product in an exchange system.

The various features of the present invention are described herein.

Embodiments of the invention will be described in terms of an automated exchange market for stock options; options being contracts for the purchase or sale of a listed security at a particular strike price to be exercised on a particular date in the future. The invention is not limited to markets for stock options and includes markets for derivative instruments on any underlying instrument, including equity stocks, currencies, futures, commodities, exchange traded funds, bonds and the like. Embodiments of the invention can be adapted to any environment where large numbers of quotes are submitted by high frequency traders. Because the number of quotes made available to the market is large compared to the rate at which updated quotes can be transmitted to the market, an interruption in the trader's ability to update quotes can create a condition where the quotes become obsolete or result in unprofitable trades for the market maker because of changes in the market price.

An automated exchange according to the invention is administered by a business entity, for example, the International Securities Exchange LLC ("ISE") of New York, N.Y., which authorizes certain persons as members. The business entity may authorize different types of members or participants, such as a primary market maker (PMM) and one or more competitive market makers (CMMs) to enter quotations in particular classes of options. Market makers are authorized to maintain a two-sided market in one or more instruments by providing firm quotes to buy and sell.

It is to be understood that the names, types and arrangement of participants and quotes are used as examples for purposes of illustration. It is to be understood that the particular arrangement of participants and quotes may be varied and remain within the scope of the invention. The embodiments described herein conform to the rules imposed by a certain type of business entity. It is to be understood that an exchange which conforms to a different set of rules is nevertheless within the scope of the invention. Further, it is to be understood that the term "exchange" does not limit the use of the invention to an entity that is a registered exchange, that is to say, the invention may be administered by other types of business entities, such as Electronic Communications Networks (ECNs), broker-dealers, associations or others.

Accordingly, disclosed is a system and method for trading financial instruments on an automated exchange comprising a participant system for communicating with an automated exchange system. The disclosed system and method allows a market professional such as a market maker to "inactivate" the quotes in all instruments for a related product while the market maker's quoting engine continues to update the quotes. As shown in the embodiments below, the market maker can inactivate all quotes in all products for which it is authorized, all quotes in one or more such product, or quotes in one or more instruments.

According to an embodiment of the invention, the exchange computer system sets flags, referred to herein as Quote Inactivation flags, to identify market marker's quotes that are no longer available for trading. According to one aspect, all the quotes from a market marker can be set with such a flag. In another aspect, a market maker's quotes for one or more products can be set with such flag. In another aspect the market maker's quotes in one or more instruments can be set with such a flag. The market maker's quoting system continues to stream quotes as to the market.

The flagged quotes are processed and stored by the exchange, but are not displayed and cannot be traded. When the market maker reactivates the quotes by removing the flags, the quotes are displayed and can be traded against.

According to a further aspect of the invention, the market maker is provided with an application that runs independent of the market maker's quote streaming system to inactivate and reactivate the quotes. The market maker is provided with a small application that can run over an independent network and independent computing system that control Quote Inactivation flags. This independent system allows the market maker inactivate quotes when its quote streaming system is having technical problems.

Also disclosed is a system component and method for updating of the BBO of the exchange. The BBO for the exchange is calculated as the total size available for an instrument on the exchange at the best bid price and best offer price. It is updated with each order and quote entered onto the market. Under normal operating conditions, around 70,000 quotes per second are reviewed for a BBO calculation, and the BBO calculation is triggered by the submission or removal of quotes from the market. It is for this reason that the mass submission or removal of quotes to or from the market can result in a spike in BBO updates and calculations that slows the system. As ordinarily skilled artisans understand, while every quote on the market at a given time is considered when recalculating the BBO, not every new quote will cause the BBO to be recalculated as many of the quotes will not be at the best bid or offer price. The disclosed system and method regulates the size of the quote data set and the rate at which quote data is processed. The recalculation of the BBO triggered by quotes that are inactivated or reactivated is spread over a period of time as recalculation triggered by inactivated or reactivated quotes is delayed. This reduces the number of quotes that would otherwise need to be considered in computing the BBO at the instant the quotes are inactivated or reactivated, and this reduces the spike in calculations.

As discussed above, according to an embodiment of the invention, a market marker inactivates its quotes for one or more of the products it is authorized to make a market in by setting Quote Inactivation flags. While those flags are set the market maker's quote streaming system continues to stream updated quotes to the exchange, but those quotes are not displayed and cannot be traded. During this period, the exchange computer acts in response to the Quote Inactivation flags and does not use these quotes to calculate the BBO. When the market maker has resolved whatever issue caused it to inactivate its quotes, the flags are reset to reactivate the quotes. At that time, the reactivated quotes may be used to calculate the BBO. However, this makes a large number of quotes available to the market in a short period of time. This can tax system resources that calculate the BBO.

According to an embodiment of the invention, when a market maker reactivates the quotes, the BBOs will not be recalculated immediately based on those newly reactivated quotes. Instead, a timer is set to postpone calculation of the BBO based on these inactivated quotes by a small configurable delay. While this delay is in progress, the exchange will execute other quote updates based on non-inactivated quotes, such as those from other market markers that have not inactivated quotes or new quotes from the market maker who did inactivate quotes. Each quote from these other market markers other than the reactivated quotes will cause the BBO to be recalculated. After the delay has elapsed, the system will then force a recalculation of any instruments that were not already recalculated. Because many active instruments will be recalculated during the delay period as a result of these other quote updates (e.g., by other market makers or new quotes from the same market maker) the number of instruments for which the BBO will need to be recalculated as a result of the reactivated quotes will be more manageable.

FIG. 1 shows an exchange 1 according to an embodiment of the present invention connected with a number of entities. An order placed on the exchange 1 may be a limit order that specifies an order size, that is, an integral number of contracts, at a bid price or offer price. The order may also be a market order. It is understood that a market order is to be executed at the best available price, which is the highest price in the case of a market order to sell and the lowest price in the case of a market order to buy.

One or more market markers 3, 5, 7, are connected with the exchange 1. These market markers include quote streaming systems that provide updated quotes to the exchange 1 for one or more products. As market prices move, the market makers 3, 5, 7, update their quotes accordingly. The quotes are live and can be traded against by any other parties, for example other market makers 3,5, 7, customers 13,15, and electronic access members 11.

The exchange 1 is also connected with a reporting entity 19. The reporting entity 19 may be, for example, the Options Price Reporting Authority (OPRA), which collects price and size data for all options traded on exchanges in the United States and provides this data to subscribers. The exchange 1 communicates the prices of each trade to the reporting entity 19. The exchange also communicates the BBO to the reporting entity 19.

Telecommunication or network links between the exchange and each of the entities 3-21 can be made by any of a number of known electronic data exchange mechanisms. For example, the exchange 1 may communicate to outside entities 3-21 via local area networks, wide area networks, direct electronic or optical cable connections, dial-up telephone connections, or a shared network connection including the Internet using wire and wireless based systems.

Data can be exchanged between the exchange 1 and entities 3-21 via data terminals or computer devices located at the entities 3-21. Data terminals may be any of a number of known data processing machines, for example, computer workstations, personal computers, minicomputers, mainframe computers, personal digital assistants, and the like. Terminals at the entities 3-21 include software capable of communication with the exchange 1 using a predetermined data format. Data may also be communicated from members to the exchange through the use of third-party services 12 that connect to the exchange.

The exchange 1 may be implemented on a general-purpose computer under the control of a software program. According to one embodiment of the invention, the exchange 1 can be implemented on, for example, an Open VMS system running the OM Click Exchange™ software manufactured by OM Technology AB. Alternatively, the exchange 1 can be implemented on a network of general-purpose computers each under the control of a separate software program or on a system of interconnected parallel processors. Although complex, it is believed that suitable software for performing the various functions described herein can be designed and constructed by computer programmers of ordinary skill.

Figure 1A:
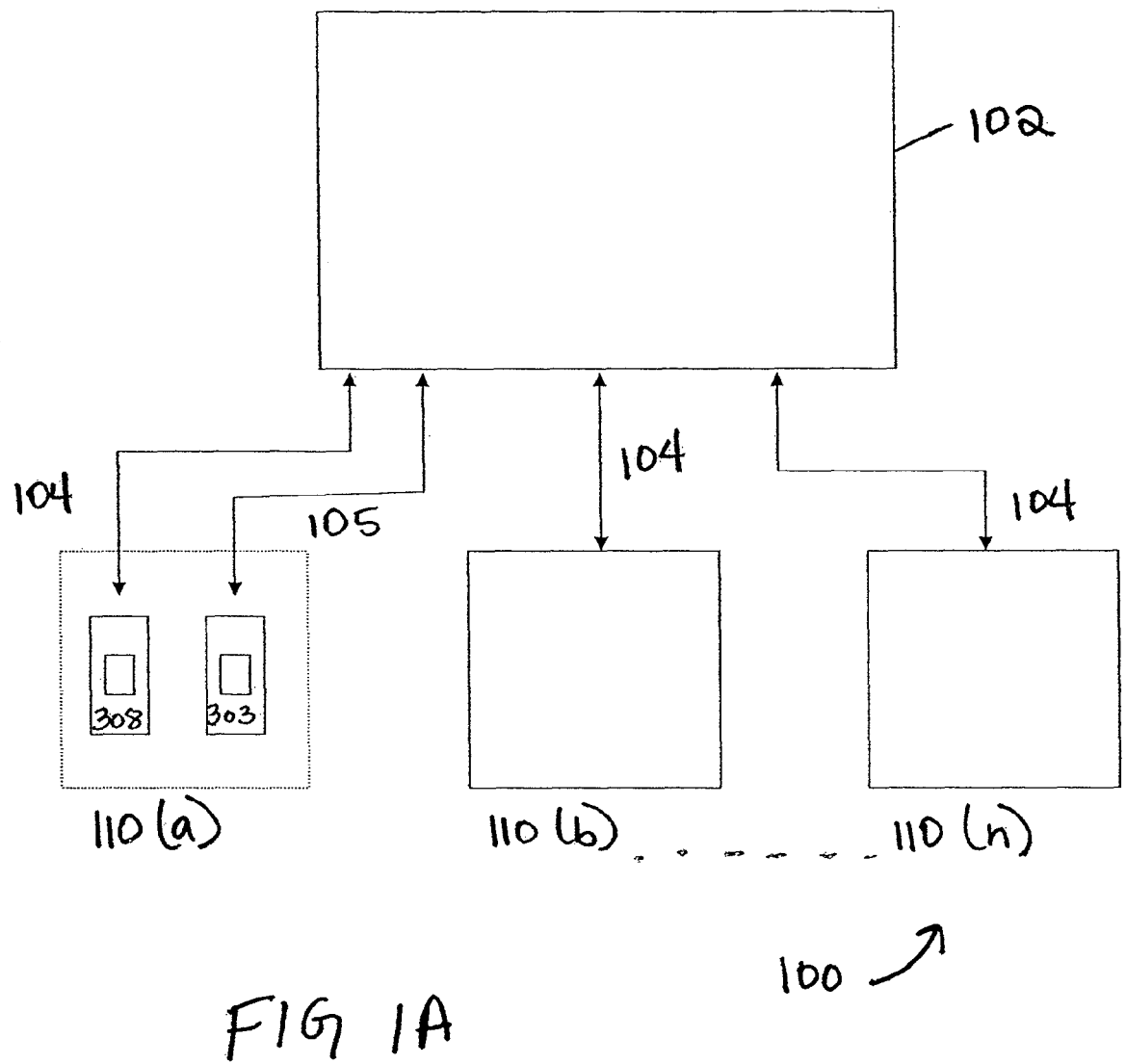
FIG. 1A shows a network environment adapted to support an embodiment of the present invention.

FIG. 1A shows a network environment 100 adapted to support the present invention. The exemplary environment 100 includes a network 104, a server 102, a plurality of communication appliances, or user locations, or participant systems, 110(a) . . . (n) (where "n" is any suitable number) (collectively referred to herein as, participant systems 110). Participant systems can include wired and wireless participant systems. Trading, transacting and executing orders occurs by the inter-operation of the components of network 100. For example, participant systems 110 are adapted and arranged to respond to orders generated by server 102. This response may occur as a result of preprogrammed instructions and can occur without intervention of an operator.

The network 104 is, for example, any combination of linked computers, or processing devices, adapted to access, transfer and/or process data. The network 104 may be private Internet Protocol (IP) networks, as well as public IP networks, such as the Internet that can utilize World Wide Web (www) browsing functionality, or a combination of private networks and public networks. A network can include, for example, a plurality networks 104, 105, each with dedicated network architecture, and such networks can operate independently of one another.

The server 102 for an automated exchange system is adapted to access data, transmit data to, and receive data from, participant systems 110 and 120, via the network or networks 104, 105. The server 102 and participant systems 110 typically utilize a network service provider, such as an Internet Service Provider (ISP) or Application Service Provider (ASP) (ISP and ASP are not shown) to access resources of the network 104.

Server 102 is described in more detail with reference to FIG. 2, herein.

Figure 2:
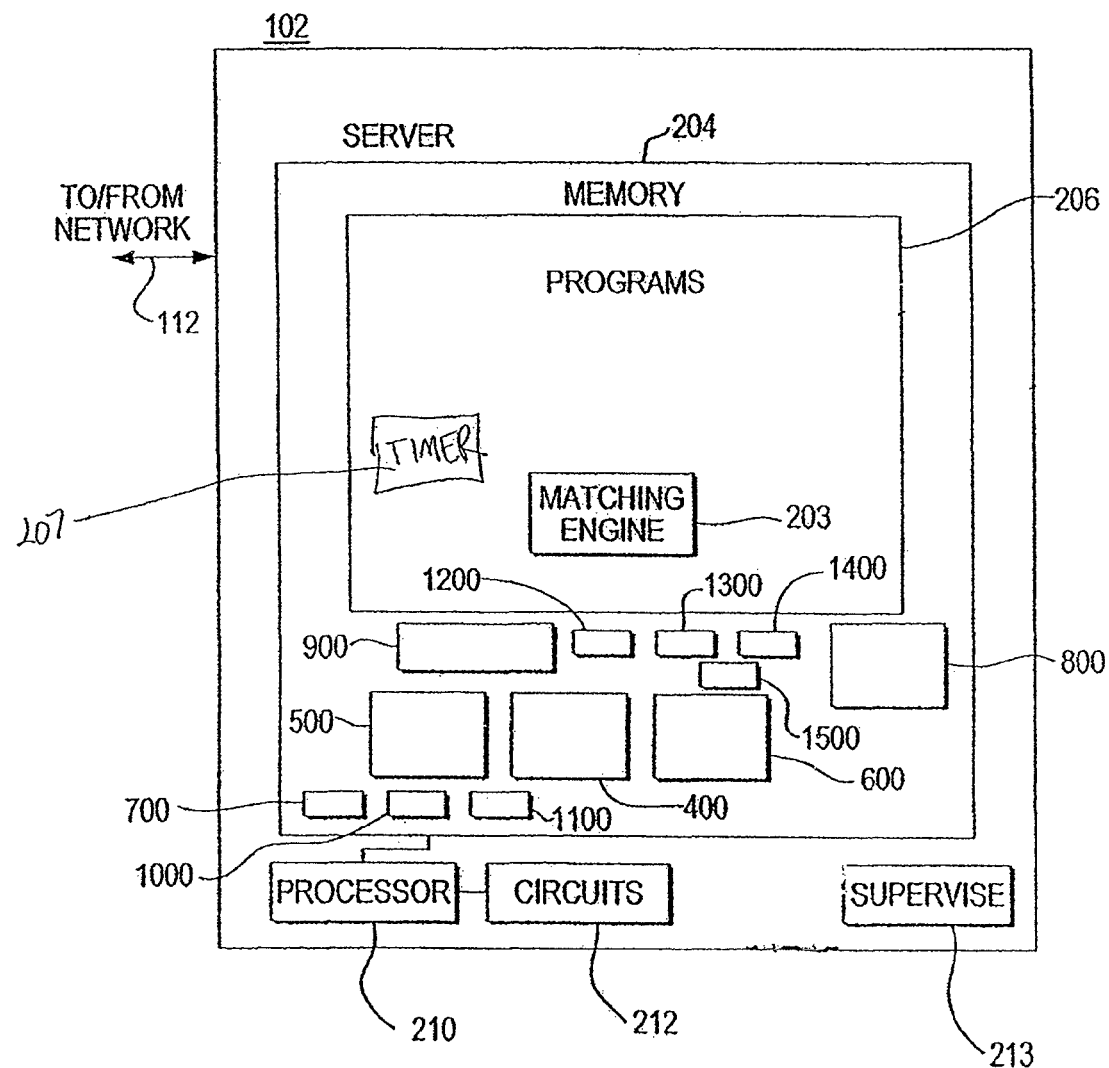
FIG. 2 illustrates a processing apparatus adapted to store and process data related to the present invention.

FIG. 2 illustrates that server 102 for an automated exchange system (shown as 1 in FIG. 1), which is adapted to access, store and process data related to the present invention, is operatively connected to the network (shown as 104 in FIG. 1A), via interconnector 112. The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

Server 102 is operatively connected to network 104, via bi-directional communication channel, or interconnector, which may be for example a serial bus such as IEEE 1394, or other wire or wireless transmission medium. Examples of wireless transmission medium include transmission between a modem (not shown), such as a cellular modem, utilizing a wireless communication protocol, or wireless service provider or a device utilizing a wireless application protocol and a wireless transceiver (not shown). The interconnector may be used to feed, or provide, order and quote data to server 102.

Server 102 includes a memory 204, market supervisor module 213, processor 210 and circuits 212. The server 102 may also include integrated server management features and an interface that interacts and exchanges data with other terminals of network environment 100.

The server 102 is adapted to receive order data from participant systems 100 and store or process the data such that transactions can be executed as well as quotes. The server 102 is also adapted to provide data related to proposed transactions to other participant systems 100. For example server 102 can accept quotes from participant systems in formats known to ordinarily skilled artisans. Orders and quotes may be delivered through a routing complex that has an appropriate platform and reports, summaries and/or invoices for transactions may be delivered to participant systems, or agents through the routing complex. The server 102 is also adapted to interface, via network 104, with one or more external trade reporting entities, such as a central market data reporting agency including OPRA. This functionality may utilize multiple interfaces depending on separation of information. Furthermore, the server 102 may deliver matched trades to the Options Clearing Corporation (OCC) for clearance and settlement as well as report quotes and trades to a securities information processor as well as store and provide audit information to an appropriate authority or regulatory agency.

Memory 204 may be, for example, dual hot-plug Ultra320 SCSI 3.5" hard drives, DDR-3 Registered (RDIMM) memory that stores programs 206, which include, for example, algorithms 400, 500, 600, 700, 800, 900, 1000, 1100, 1200, 1300, 1400 and 1500 as well as typical operating system programs (not shown), input/output programs (not shown), and other programs that facilitate operation of server 102. These algorithms, or program code, 400, 500, 600, 700, 800, 900, 1000, 1100, 1200, 1300, 1400 and 1500 are each a series of steps for manipulating and executing transactions, which are typically stored on a computer-readable memory or medium and executed by a processor. The memory 204 also stores a matching engine, module or facility, 203, which is software, program code or algorithm, adapted to match bids and offers for financial instruments. The matching engine 203 facilitates transactions by determining transactions that that may be executed and when the transaction may be executed.

Supervisor module, or facility, 213 is typically software, program code or a series of steps adapted to control and monitor transactions performed by server 102. This module 213 may also store and/or access market data indicative of the state or status of various markets which may be for example domestic markets and/or international markets. The market data accessed using network 104, as described in FIG. 1A, herein.

Processor 210, which is operatively connected to memory 204, is used to access, process and manipulate the data retrieved and stored by server 102. The processor 210 is typically a microprocessor with sufficient speed and processing capacity to adequately perform the desired data manipulations of server 102. The processor 210 may be, for example, Intel® Xenon 5500 series processors. Circuits 212 are operatively connected to processor 210 and typically include, for example, Integrated Circuits (ICs), ASICs (application specific ICs) power supplies, clock circuits, cache memory and the like, as well as other circuit components that assist in executing the software routines stored in the memory 204 and that facilitate the operation of processor 210.

Accordingly a plurality of quotes and quote handling instructions can be received from a participant system 110 operated by market makers 3, 5, 7 for the purchase or sale of option instruments for a product can be received via the interface 112. The exchange 102 includes among its programs 206 a program that makes the received quotes from a market maker available for a trade thereon. The exchange also includes a program to receive an instruction from a market maker 3, 5, 7 to make the quotes from that market maker inactive for a transaction on the one or more designated instruments or products that the market maker is authorized to quote. The exchange 102 makes the received quotes unavailable for a trade thereon. For instance, a Quote Inactivation flag is set in the matching engine 203, and the flag instructs the system to ignore quotes from the participant system 110 (e.g. the market maker), or to ignore select quotes from the participant system 110. The quote handling instructions can further include instructing the exchange system to make the quotes inactive for a transaction on all products and instructing the exchange system to reactivate the quotes for a transaction on all products. The instructions can also include inactivating and reactivating quotes for a select product or products. Thus, for example, a Quote Inactivation flag can be set on a product such as options contracts for IBM stock, whereby the system will "turn off" all quotes in IBM contracts from that market maker. The quotes, however, remain on the exchange system while inactive. The quotes are stored in book memory (not shown), but are not made available for trade or used to update or calculate the BBO while flagged. When the exchange receives an instruction to reactivate the quotes for a transaction on the product, the exchange makes the received quote available for a trade thereon. As explained above the quote handling instruction can comprise a Quote Inactivation flag on the instrument, product, or products, which hides the quotes from the market while flagged as inactive. When a market maker's quotes for an instrument or product are made inactive the exchange 102 does not display these quotes to other market participants.

Exchanges 102 have among their programs 206 a program that calculates a BBO as a function of orders and quotes submitted to the exchange. As explained above, when an inactivation instruction is sent to the exchange 102 from a market maker, any quotes subject to that instruction from that market maker are not available for recalculating the BBO. In one embodiment, a timer 207 is configured to interpose a delay (or a number of delays) on the BBO calculation for a predetermined time period upon the inactivation of quotes or reactivation of inactive quotes for a market maker's instrument or product. During the delay period, that market maker's quotes continue to stream to the exchange 102, via the network 104, but the exchange does not trigger an update of the BBO based on the inactivated or reactivated quotes until after the delay, although any new quotes not subject to the instruction from the market maker will trigger an update of the BBO, as will any quotes from other market makers. The exchange 102 continues to update and recalculate the BBO when quotes that have not been inactivated or reactivated are received. During the delay a matching engine matches orders and quotes available for trade, including the reactivated quotes. After the delay, the exchange's programs 206 updates and calculates a BBO as a function of the quotes that are subject to the quote handling instruction, as described herein.

Market maker's participant systems 110 include a quote streaming systems. They may be capable of processing and storing data themselves or merely capable of accessing processed and stored data from another location (i.e., both thin and fat terminals). These participant systems 110 are operatively connected to networks 104, 105 via bi-directional communication channels 116, 122, respectively, which may be for example a serial bus such as IEEE 1394, or other wire or wireless transmission medium, as described herein. Exemplary, participant systems 110 are described in more detail in relation to FIG. 3, herein.

Figure 3:
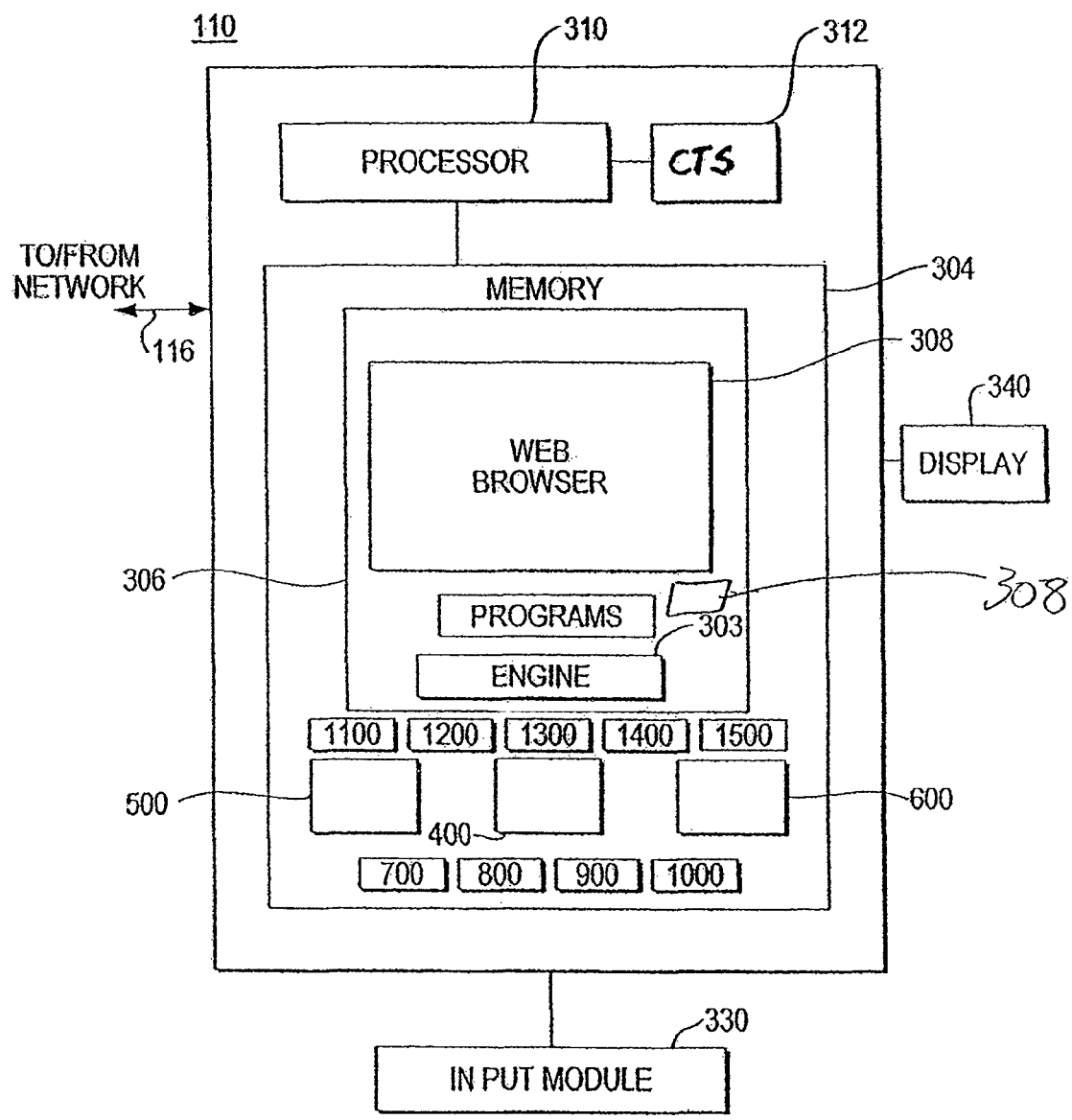
FIG. 3 illustrates an example of a communication appliance used on the automated exchange system shown in FIG. 1.

FIG. 3 illustrates a participant system or communication appliance 110 for a market maker (e.g., PMM, CMM). Participant system 110 can include an OMS that resides on a computer device capable of interfacing with a network, such as an IP network. The participant system can include a server 110 operatively connected to network 116, via bi-directional communication channel, or interconnector, which may be for example a serial bus such as IEEE 1394, or other wire or wireless transmission medium. The participant system server 110 includes a memory 304, processor 310 and circuits 312. The server 110 may also include integrated server management features and an interface that interacts and exchanges data with other terminals of network environment 100. Participant System 110 also includes support circuitry 312, input module 330 and display module 340. Bi-directional interconnection medium 116 operatively connects the terminal 110 to the network (shown as element 104 in FIG. 1).

Processor 310, which is operatively connected to memory 304, is used to process and manipulate the data retrieved, communicated and stored by Participant System 110. Processor 310, which is operatively connected to memory 304, is used to access, process and manipulate the data retrieved and stored by server 110. The processor 310 is typically a microprocessor with sufficient speed and processing capacity to adequately perform the desired data manipulations of server 110. The processor 310 may be, for example, Intel® Xenon 5500 series processors. Circuits 312 are operatively connected to processor 310 and typically include, for example, Integrated Circuits (ICs), ASICs (application specific ICs) power supplies, clock circuits, cache memory and the like, as well as other circuit components that assist in executing the software routines stored in the memory 304 and that facilitate the operation of processor 210.

Input module 330 is, for example, a keyboard, mouse, touch pad, track-ball, menu having soft-keys, or any combination of such elements, or other input facility adapted to provide input to participant system 110.

Display module 340 is, for example, a monitor, LCD (liquid crystal display) display, GUI (graphical user interface) or other interface facility that is adapted to provide or display information to a user.

Memory 304 stores programs 306, which include, for example, a web browser 308, as well as typical operating system programs (not shown), OMS programs (not shown), a quoting engine 303, and other programs that facilitate operation of participant system 110. The quoting engine 303 electronically generates a plurality of quotes for the purchase and sale of option instruments for a product. For example quoting engine 303 can generate and stream quotes for the automated exchange system server 102. Quotes may be delivered through a routing complex that has an appropriate platform. Algorithms, or program code, or software, or executable code 400, 500, 600, 700, 800, 900, 1000, 1100, 1200, 1300, 1400 and 1500 are a series of steps, typically executed by a processor such as, for example, processor 310, to manipulate selected data from the participant system. Also, while the system is shown as a single computer, as explained above, the participant system 110 may be capable of processing and storing data itself or capable of accessing processed and stored data from another location (e.g., as either thin and fat terminals). Thus a participant system 110 may distribute and operate its various functions on its own network (as illustrated at FIG. 1A, 110(*a*), for example).

The participant system 110 includes among it programs 306 a program 308 that generates a quote handling instruction for the plurality of quotes for a product. Such a program can be in the form of an application that interfaces with a network that is independent of the participant system's network or system components that generate quotes. Alternatively, the program for generating quote handling instructions may run on a separate computer system (not shown), connected to the network or capable of communicating quote handling instructions to the exchange 102 independently of the network. The separate computer system may be one of a variety of known computer systems including servers, personal computers, or personal digital assistants (PDAs).

Quote handling instructions include instructing the exchange system to make the quotes inactive for a transaction on the product. As explained herein, the quotes remain on the exchange system 102 while inactive. According to one aspect of the invention, the participant system continues to stream quotes to the exchange and the quote handling instruction applies to the streamed-in quotes so that they remain inactive. Quote handling instructions also include instructing the exchange system 102 to reactivate the quotes for a transaction on the product. The quote handling instructions can further include instructing the exchange system 102 to make the quotes inactive for a transaction on all products and instructing the exchange system to reactivate the quotes for a transaction on all products. The instructions can also include inactivating and reactivating quotes for a select product or products or for one or more instruments. Quotes and quote handling instructions may be transmitted via the interface 116 to the exchange system 102 or by a separate network (not shown).

The participant's network interface 116 can be operatively connected to a plurality of networks 104, 105 and the network 104 that the quote handling instruction is transmitted to the exchange system can be independent of the network 105 that the plurality of quotes is transmitted to the exchange system on. Thus, for example, as shown in FIG. 1A, if the participant system 110(*a*) could be provided with access to a network 104 by the exchange service for submitting instructions that is independent of the network 105 that the participant's quoting engine 303 is connected to. Thus, in such an embodiment, the participant is provided with an application 308 that allows for an independent network 104 connection to the server. In such an embodiment, if the component of the participant's system 110 by which it generates quotes fails or becomes impaired, the participant system 110 could still submit an inactivation instruction over the independent network 104.

Figure 4:
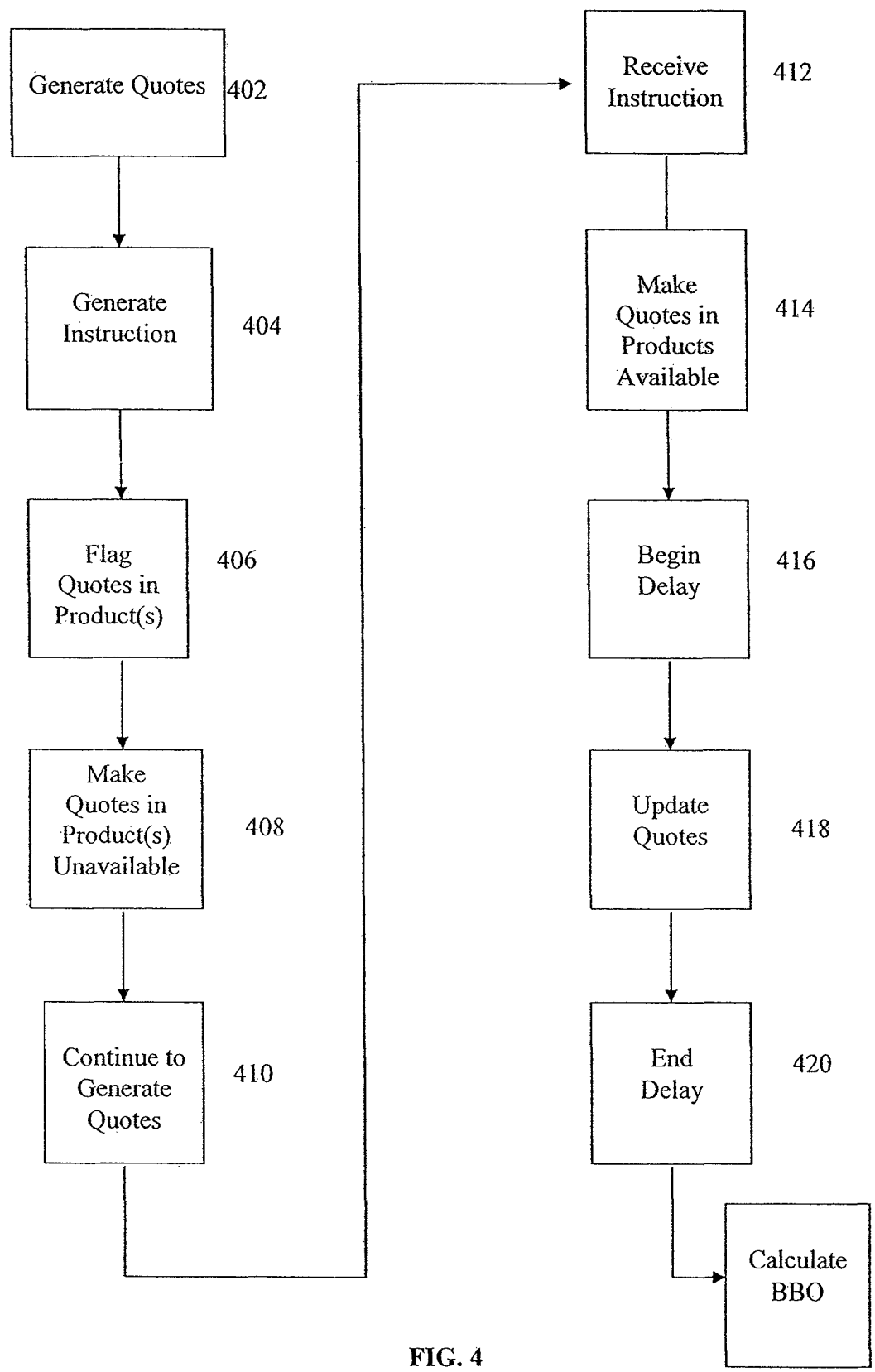
FIG. 4 illustrates a flow chart showing an exemplary process carrying out an embodiment of the invention.

FIG. 4 illustrates a flow chart for a process of inactivating and reactivating quotes according to one embodiment of the invention.

As discussed above, according to an embodiment of the invention, a market marker generates and streams quotes 402 for the purchase and sale of one or more products onto the market 102. Upon, for example, questioning the accuracy of the quotes, the market maker inactivates its quotes for one or more of the products 406 by instructing 404 the exchange to set Quote Inactivation flags 406. The quotes in the flagged product or products are thus made unavailable. In particular, while those flags are set, the market maker quote streaming system continues to stream updated quotes to the exchange 412, but those quotes are not displayed and cannot be traded. As explained below, a delay can be interposed 408,410 after inactivation to smooth the effect of inactivating a large number of quotes. While the quotes are inactivated, these quotes are not used to calculate the BBO. When the market maker has resolved whatever issue caused it to inactivate its quotes, it sends an instruction to reactivate the quotes 414. The flags are reset to reactivate the quotes, making the product available 416. At that time, the reactivated quotes can be used to calculate the BBO.

Having a large number of quotes suddenly inactivated or reactivated can tax system resources that calculate the BBO. Under normal operating conditions, the BBO is updated for recalculation whenever a new quote is submitted to the market or a quote is removed from the market. Hence the inactivation and reactivation quotes from the market triggers an update of the BBO. Thus according to another embodiment, when a market maker inactivates 404 quotes and makes them unavailable 406 or reactivates 414 the quotes and makes them available 416, a timer can postpone triggering a calculation of the BBO by a configurable delay or successive delays 408, 418. While this delay 408, 418 is in progress, the exchange will execute other quote updates 420 for quotes that are not inactivated or reactivated (e.g., from other market markers that have not inactivated quotes, or, where a market maker has inactivated or reactivated only a portion of its quotes, updates 420 can continue in the quotes not subject to an inactivation or reactivation instruction). Each of these other quote updates 420 can cause the BBO to be recalculated. After the delay has elapsed 422, the system will then trigger an update and recalculation 424 for any instruments that were not already recalculated as a result of updates 420 received during the delay. In the case of reactivated quotes, because many active instruments will be recalculated during the delay period beginning after reactivation 418, the number of instruments for which the BBO will need to be recalculated as a result of the reactivated quotes will be more manageable compared with recalculation based on the reactivated quotes, and compared with methods whereby a market maker deleted and reloaded quotes. While a mass removal or input of quotes creates a spike that slows the system, the embodiment interposes a delay 418 that postpones the update of the quotes for reactivated quotes that can trigger the BBO calculation. Because the quotes are available for transaction, however, the reactivated quotes are nonetheless included in any BBO calculations triggered by other quote updates 420. Thus as other updates 420 and triggering events occur, such as quotes submitted to the market by other market makers, the BBO is calculated taking account of the reactivated quotes available on the market. After the delay expires 422, an update 424 is then triggered by the reactivated quotes. As is understood by ordinarily skilled artisans, while every quote on the market is considered for recalculating the BBO, not every quote will cause the BBO to be recalculated. Thus at the expiry of a delay 424, the number of quotes that need to be considered is reduced, and the number of instruments for which the BBO must be recalculated is also reduced.

In yet another embodiment the timer is further configured to interpose a plurality of delays over a plurality of successive predetermined time periods, and a predetermined percentage or number of the quotes subject to the quote handling instruction can be used to update the best bid and offer after each time period expires. Accordingly, the delay can be configured to smooth the effect of the quote handling instruction. The delay can, for example, be interposed in successive intervals (e.g., $1/10$ or $1/100$ of a second), and after each interval, a select number of the quotes that were made inactive or reactivated by the instruction are used to update the BBO and trigger a BBO recalculation. For instance, if 70,000 quotes are subject to the quote handling instruction, the delay can be interposed at intervals of $1/100$ of a section, and at each interval, 700 quotes are used to update the BBO and trigger a BBO recalculation. Thus, the update and calculation of the BBO for the 70,000 quotes is smoothed over the course of a second, thereby diminishing the impact of the sudden availability or unavailability of a large number of quotes to the market. Accordingly, the disclosed system and method can regulate the size of the quote data set and the rate at which quote data is processed. The recalculation of the BBO triggered by quotes that are inactivated or reactivated is spread over a period of time as recalculation triggered by inactivated or reactivated quotes is delayed. This reduces the number of quotes that would otherwise need to be considered in computing the BBO at the instant the quotes are inactivated or reactivated, and this reduces the spike in calculations.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A system for trading financial instruments on an automated exchange comprising:
    a participant computer system for communicating with an automated exchange system including;
    a processor;
    a memory, the memory including
    program memory for a quote engine that electronically generates a plurality of quotes for the purchase and sale of an instrument,
    program memory for a program, that, when the processor executes program instructions, generates a quote handling instruction for the plurality of quotes for the instrument, wherein the quote handling instruction includes
    instructing the exchange system to make the quotes inactive for a transaction thereon, wherein the quotes remain on the exchange system while inactive, and
    instructing the exchange system to reactivate the quotes for a transaction thereon; and
    an interface operatively connected to a network and adapted to transmit the quotes to the exchange system, and transmit the quote handling instruction to the exchange system; and
    the automated exchange for trading a financial instrument, the automated exchange including:
    a server having a processor;
    an interface operatively connected to the network and adapted to receive the plurality of quotes for the purchase or sale of the instrument, and the quote handling instruction; and
    a memory, the memory including
    program memory for a program that, when the processor executes program instructions,
    makes the received quotes unavailable for a transaction thereon if the received quote handling instruction instructs the exchange system to make the quotes inactive, wherein the quotes remain on the exchange system while inactive;
    makes the received quotes available for a transaction thereon if the received quote handling instruction instructs the exchange system to reactivate the quotes;
    executes an update of quotes on the exchange for a best bid and offer calculation;
    calculates the best bid and offer as a function of the update; and
    operates a timer configured to interpose a plurality of delays over a plurality of successive predetermined time periods upon the execution of a quote handling instruction,
    wherein the quotes subject to the quote handling instruction do not trigger the update of the best bid and offer during a first time period, wherein the matching engine updates the best bid and offer triggered by quotes other than the quotes subject to the quote handling instruction during the first time period, and wherein a predetermined portion of the quotes subject to the quote handling instruction trigger the best bid and offer update after a subsequent time period of the plurality of time periods expires.

2. The system of claim 1 wherein the network that the participant's network interface is operatively connected to includes a plurality of networks, and the network by which the quote handling instruction is transmitted to the exchange system is independent of the network by which the plurality of quotes are transmitted to the exchange system.

3. The system of claim 1 wherein the instrument includes a plurality of instruments and the quote handling instruction includes instructions to inactivate and reactivate the quotes for some or all of the instruments.

4. The system of claim 3 wherein the plurality of quotes include quotes for the plurality of instruments in a plurality of products and the quote instruction includes an instruction selected from the group consisting of:
   instructing the exchange system to make the quotes inactive for a transaction in all products;
   instructing the exchange system to reactivate the quotes for a transaction in all products;
   instructing the exchange system to make the quotes inactive for in a select product; and
   instructing the exchange system to reactivate the quotes for a transaction in the select product.

5. The system of claim 1 wherein the quote handling instruction comprises a flag.

6. An automated exchange for trading a financial instrument, including:
   a server having a processor,
   an interface operatively connected to a network and adapted to receive a plurality of quotes for the purchase or sale of an instrument and a quote handling instruction; and
   a memory, the memory including
   program memory for a program that, when the processor executes program instructions,
   makes the received quotes unavailable for a trade thereon if the received quote handling instruction instructs the exchange system to make the quotes inactive for a transaction thereon, wherein the quotes remain on the exchange system while inactive; and
   makes the received quote available for a trade thereon if the received quote handling instruction instructs the exchange system to reactivate the quotes for a transaction thereon, the memory further including,
   program memory for a matching engine that, when the processor executes program instructions, executes an update of quotes on the exchange for a best bid and offer calculation;
   program memory for a program that, when the processor executes program instructions, calculates the best bid and offer as a function of the update; and
   a timer configured to interpose a plurality of delays over a plurality of successive predetermined time periods upon the receipt of a quote handling instruction,
   wherein the quotes subject to the quote handling instruction do not trigger the update of the best bid and offer during a first time period, wherein the matching engine updates the best bid and offer triggered by quotes other than the quotes subject to the quote handling instruction during the first time period, and wherein a predetermined portion of the quotes subject to the quote handling instruction trigger the best bid and offer update after a subsequent time period of the plurality of time periods expires.

7. The exchange of claim 6 wherein the network that the exchange's network interface is operatively connected to includes a plurality of networks, and the network that the quote handling instruction is received on is independent of the network that the plurality of quotes is received on.

8. The exchange of claim 6 wherein the instrument includes a plurality of instruments and the quote handling instructions include instructions to inactivate and reactivate the quotes for some or all of the instruments.

9. The exchange of claim 8 wherein the quotes are received for a plurality of instruments in a plurality of products, and the quote instructions include instructions selected from the group consisting of:
   instructing the exchange system to make the quotes inactive for a transaction on all products;
   instructing the exchange system to reactivate the quotes for a transaction on all products;
   instructing the exchange system to make the quotes inactive for a select product; and
   instructing the exchange system to reactivate the quotes for a transaction on the select product.

10. The exchange of claim 6 wherein the quote handling instruction comprises a flag.

* * * * *